Figure 1:
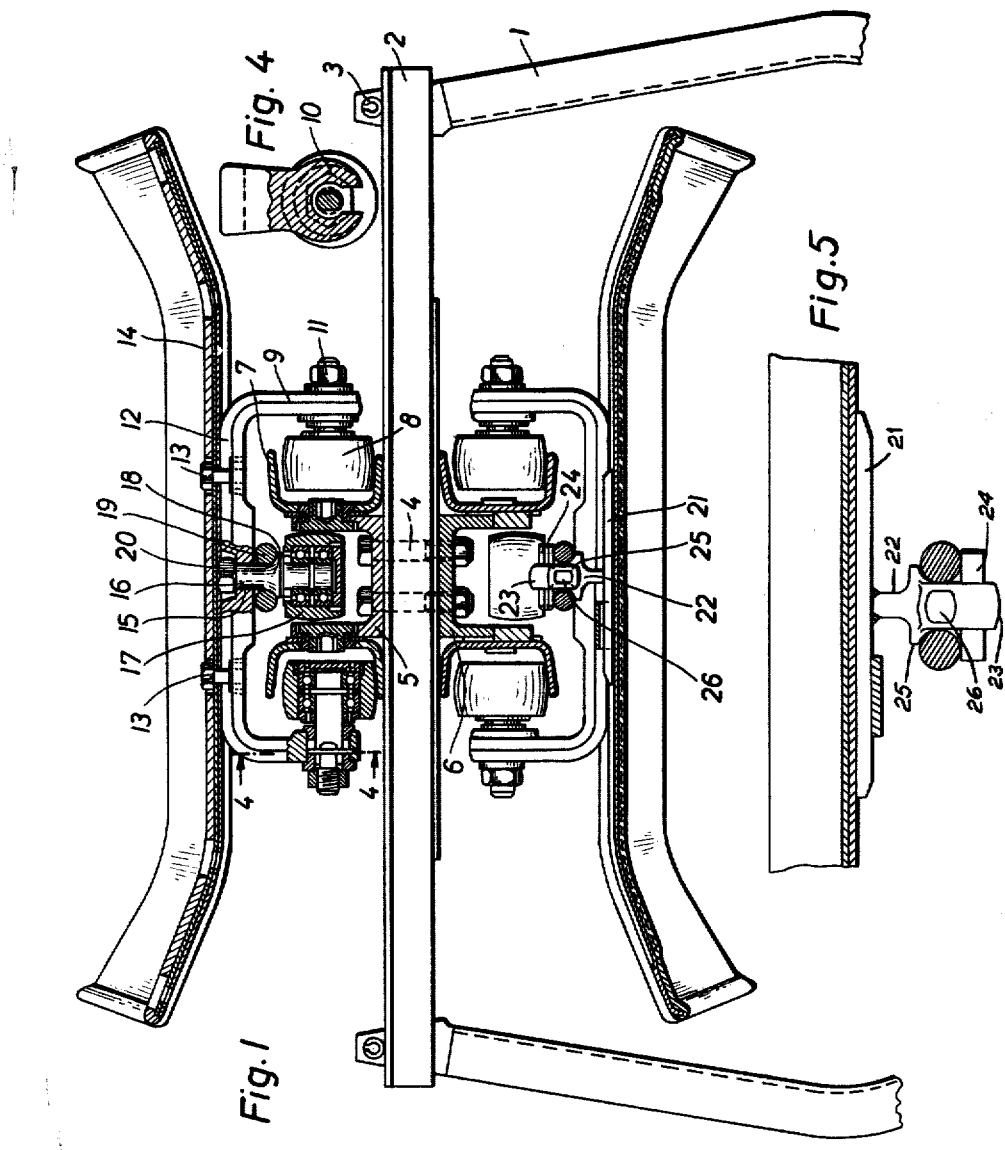

Oct. 22, 1963     F. JORDAN     3,107,778
CONVEYOR BELT GUIDE ASSEMBLY
Filed Aug. 18, 1960     2 Sheets-Sheet 2
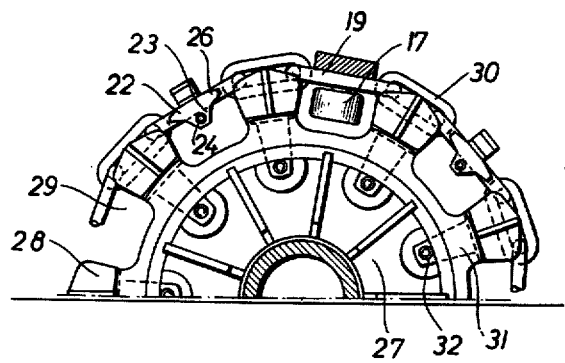
Fig. 2
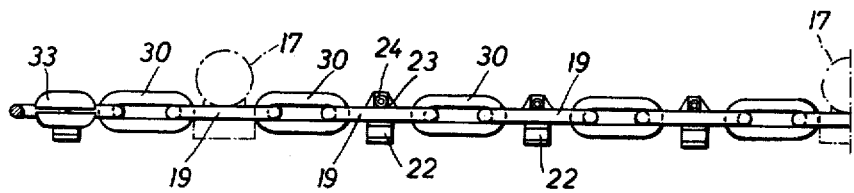
Fig. 3
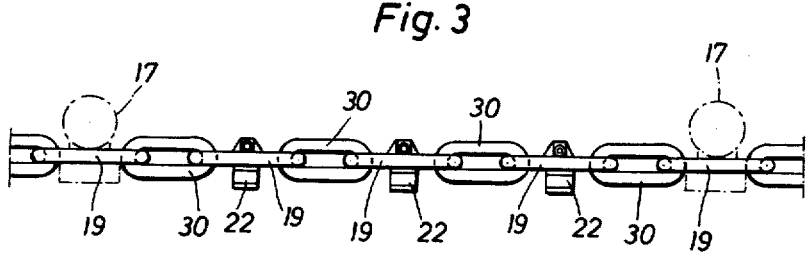
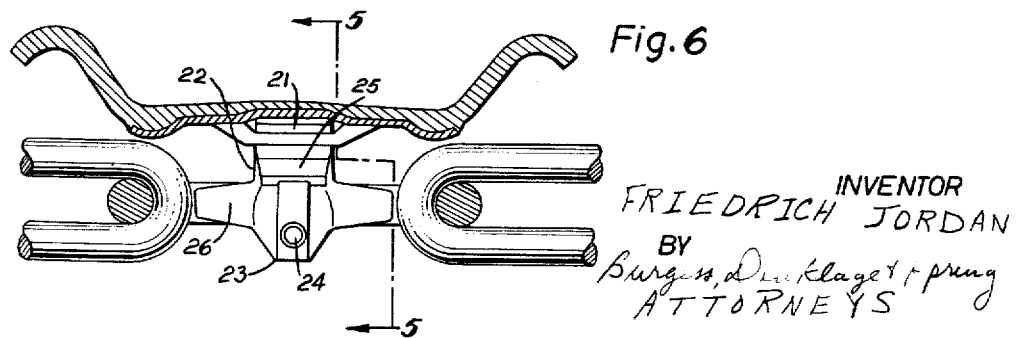
Fig. 6
INVENTOR
FRIEDRICH JORDAN
BY
Burgess, Dinklage & Sprung
ATTORNEYS ial view of a guide assembly for a conveyor belt in accordance with

United States Patent Office

3,107,778
Patented Oct. 22, 1963

3,107,778
CONVEYOR BELT GUIDE ASSEMBLY
Friedrich Jordan, Wethmar, near Lunen, Westphalia, Germany, assignor to Gewerkschaft Eisenhutte Westfalia, Wethmar, near Lunen, Westphalia, Germany, a German corporation
Filed Aug. 18, 1960, Ser. No. 50,475
Claims priority, application Germany Aug. 20, 1959
11 Claims. (Cl. 198—201)

The present invention relates to a guide assembly for a conveyor belt, and more particularly to a conveyor belt arrangement including roller means situated in a common plane on truck means connected to the conveyor belt, the common plane being situated transversally of the longitudinal path of travel of the conveyor belt.

Various constructions are already known which relate to conveyor belts which may be mounted on a pair of sprocket wheels in space relation to one another, the conveyor belt usually being mounted on the sprocket wheels via an endless chain. Thus, an upper part and a lower part of the belt is effected and means are used to maintain the belt substantially within its normal path of travel. For this purpose, the underside of the upper course of the belt has been provided with both roller means rotating in a horizontal plane and roller means rotating in a vertical plane. Stationary guide means are situated along the path of the belt for guiding these roller means so as to maintain the belt within its normal path of travel.

In particular, belts are used which are composed of a series of sections pivotally inter-connected with one another so as to form an endless belt capable of passing about the sprocket wheels. On the under side of the upper course and the upper side of the lower course, generally, one central roller is provided and a pair of lateral rollers as well. These rollers are guided in U-shaped rails which are stationary. Generally the lateral rollers which rotate in a vertical plane are mounted in the vertical arms of a truck member which is connected to the belt. The central roller, on the other hand, was connected directly to the belt by means of a suitable vertical shaft. While attempts have been made to drive such belt merely with the use of a single central chain coupled to the belt along its length, nevertheless in practice considerable difficulties occur which have been preventing the wide use of three-roller arrangements for conveyor belts having but one central drive chain. Generally, in conventional belt constructions, where central rollers and lateral rollers were used, the central rollers were staggered with respect to the lateral rollers along the extent of the belt. Consequently, the guiding forces could only be transmitted via the chain to the vertical rollers, i.e. lateral rollers so that in the event strong lateral forces were encountered, considerable lateral play in the U-shaped guide rails resulted. Accordingly, conveyor belts of conventional design, having three rollers could never be maintained within their normal path of travel in the desired manner.

It is an object of the present invention to overcome the foregoing drawbacks and to provide a conveyor belt guide assembly including truck means connected to the conveyor belt along the extent thereof and roller means connected to the truck in a substantially common plane transverse to the longitudinal path of the belt.

It is another object of the present invention to provide such a guide assembly which is simple in construction, economical to manufacture and durable in use.

Other and further objects of the invention will become apparent from a study of the within specification and accompanying drawings in which, FIG. 1 is a schematic sectional view of a guide assembly arrangement for a conveyor belt in accordance with the invention illustrating the positional relationship between the upper and lower courses of the belt and the guiding means therefor, FIG. 2 is a schematic partial view of a side of a sprocket wheel used in accordance with the invention, showing the mounting of the chain means thereon, FIGURE 3 illustrates a schematic view of portions of the chain used to drive the belt in accordance with the invention, FIGURE 4 is a schematic sectional view of the lateral roller mounting means taken along the line 4—4 of FIGURE 1, and FIGURES 5 and 6 are enlarged, partial transverse and longitudinal sectional views, respectively, of portions of the chain and guiding means, illustrating more clearly the various constructional details.

In accordance with the present invention, it has been found that a guide assembly for conveyor belts may be provided which includes truck means for connection with the conveyor belt, coacting roller means mounted for rotation on the truck means in a substantially common plane transverse to the longitudinal path of travel of the conveyor belt and cable mounting means on the truck means substantially in said common plane for securing against displacement with respect thereto the cable means used for moving the truck means and in turn the conveyor belt along the path of travel. The coacting roller means are operably guidable along retaining guide means adjacent the path of travel of the conveyor belt so as to prevent the displacement of the truck means and in turn the conveyor belt out of the normal path of travel thereof.

Specifically, the truck means includes a transverse base for connection with the conveyor belt and a pair of flanged members outwardly extending from the transverse base. The roller means includes a central roller mounted on the transverse base for rotation on a shaft perpendicular to the plane of the conveyor belt, i.e. for rotation in a plane parallel to that of the belt as for example in a horizontal plane. The roller means further includes a pair of lateral rollers each mounted on one of the flange members of the transverse base, said lateral rollers being mounted on a corresponding side of the central roller for rotation on an axis parallel to the plane of the conveyor belt and transverse to the path of movement of the conveyor belt, i.e. for rotation in a vertical plane.

Generally, the truck means is a U-shaped member and the central roller is mounted between the U-flanges of the member while the lateral rollers are each mounted via a shaft onto the corresponding end of one of the U-flanges. Each end of the U-flanges is conveniently provided with a fork seat for receiving the lateral roller shafts thereon.

The shaft of the central roller is adjustable in length and provided with a curved seat or conical portion diverging toward the roller for receiving thereon a chain link of the cable means used for moving the truck means. The shaft of the central roller is adapted for substantially occupying the extent of the interior opening of the chain link so as to prevent longitudinal and lateral displacements of the chain link with respect to the shaft. The curved seat or conical portion on the one hand and the transverse base of the truck means on the other hand together abut the corresponding broad surfaces of the chain link and limit the movement of the chain link toward and away from the transverse base and in turn the belt upon adjustment of the length of the shaft as aforesaid.

The conveyor belt arrangement in accordance with the invention suitably includes a pair of spaced apart sprocket means, endless chain means, including alternating vertical and horizontal chain links mounted for movement on the sprocket means and a conveyor belt connected to the chain means and mounted for movement along a path of travel both in a forward, upper course, and a return lower course around the sprocket means. A plurality of auxiliary seating means are disposed along the conveyor belt between the struck means disposed in spaced relation therealong. Each of the auixiliary seating means is connected to the belt to prevent displacement of the auxiliary seating means with respect to the belt. This is necessary since the auxiliary seating means are adapted to receive thereon and secure against displacement with respect thereto correspondingly situated chain links of the cable means used for moving the truck means and belt. Preferably the auxiliary seating means includes a transverse auxiliary base connected to the belt and a support shaft mounted on the auxiliary base perpendicularly with respect to the belt. The support shaft is provided with a forward and a rearward projection, each extending longitudinally with respect to the path of travel of the belt for engaging and substantially occupying together with the adjacent portion of the support shaft the extent of the interior opening of a correspondingly positioned chain link to prevent longitudinal as well as lateral displacement of the chain link. The support shaft further includes a pair of lateral projections each extending transversely with respect to the path of travel of the belt and parallel to the plane of the belt. Securing means spaced from and parallel to the lateral projections are situated on the support shaft outwardy of the forward and rearward projections. In this manner the lateral projections, together with the securing means are adapted to receive therebetween in abutting engagement therewith the corresponding portions of appropriately positioned chain links so as to limit the displacement of the chain links in the axial direction of the support shaft.

The coacting roller means situated in a common plane transverse to the path of travel of the conveyor belt are operably guidable along retaining guide means adjacent the path of travel of the conveyor belt and preferably stationarily positioned therealong. The retaining guide means preferably includes a separate retaining track positioned for guiding engagement with each of the rollers. A U-shaped central track is preferably positioned for engagement with the central roller along the inside lateral edges thereof while a pair of lateral U-shaped tracks are provided wherein each is positioned for engagement with a corresponding lateral roller along the inside lateral edges thereof. Preferably the intermediate portion of each of the lateral U-shaped tracks is positioned on a corresponding outside lateral edge of the U-shaped central track. Conveniently, the retaining guide means are positioned adjacent the forward and return paths of travel of the belt for optimum guiding effect.

The sprocket means in accordance with the invention each includes a plurality of radially spaced replaceable teeth. These teeth have longitudinal slots for receiving the vertically positioned links of the chain as well as transverse end seats for receiving the corresponding ends of the horizontally positioned chain links interconnected with the vertical links. The space between adjacent teeth is larger than the diameter of the central rollers so that this space may receive therewithin the corresponding central rollers connected with the truck means accompanying certain of the horizontal chain links. Moreover, this space accommodates the corresponding auxiliary seating means accompanying at least a portion of the remaining horizontal chain links disposed between the chain links connected to the central roller arrangements. The horizontal chain links are suitably longer than the vertical chain links so as to accommodate the central rollers and auxiliary seating means.

Therefore, in accordance with the invention, the central roller and lateral rollers are disposed in a common plane transverse to the path of travel of the conveyor belt so as to minimize and avoid all deviations from the normal path of movement of the conveyor belt. Twisting and swinging of the belt and the chain are, therefore, kept at a minimum. The central rolls moreover may efficiently move over the corresponding sprocket wheels without difficulties. The auxiliary seating means which connect the chain with the belt serve to prevent the displacement of the belt with respect to the chain and maintain the belt on the sprocket wheels in the desired manner.

In accordance with the construction of the invention, the various parts may be suitably detachably connected to one another so that the replacement of individual parts as well as the setting up and dismantling of the arrangement may be carried out efficiently within a very short period of time.

Thus, in accordance with the invention the axis of the central roller serves to connect the truck means and belt, on the one hand, and the chain on the other. Furthermore, the truck means, shaft of the central roller, the central roller, and the chain are rigidly connected as a unit by means of a simple nut placed on the threaded end of the extended roller shaft. In this manner all the parts may be rigidly connected to the conveyor belt.

Thus, the normal lateral play encountered with conventional conveyor belt constructions using a single central chain is avoided by the construction of the invention. While heretofore, the central rollers traveled over the chain sprocket wheel, the two lateral rollers pass on both sides of the sprocket wheel. As long as there was a possibility of displacement of the two lateral rollers with respect to the central roller staggered in position with respect thereto, operational disturbances necessarily occurred. In that the central roller and the two lateral rollers are all mounted on a single truck means, in accordance with the invention, in a common plane transverse to the path of movement of the belt, no transverse displacement is possible. It will be appreciated that only by using the instant construction, preferably having chain links of unequal pitch, the longer links rotating horizontally and the shorter links rotating vertically, is it possible to construct a chain sprocket wheel which, with a limited diameter, has sufficient space to receive the central rollers between its individual teeth.

Referring to the drawings, in FIGURE 1 a retaining guide mounting support is shown including legs 1 and cross members 2, the legs 1 projecting through slots in cross members 2 at either end and being secured thereto by means of clamping sleeves 3. A pair of back-to-back U-shaped guide rails 5 are connected to cross member 2 by means of bolts 4. Thus a guide rail 5 is provided for both the upper course and lower course of the conveyor belt. Guide rails 5 are provided with side arms 6 which serve for the lateral guiding of the central rollers 17 along their inner surfaces. The guide rails 5 may be developed as continuous U-shaped rails or may consist of individual channel irons to which suitable guide rails may be attached.

On to the outer sides of arms 6 a pair of lateral U-shaped guide rails 7 are positioned wherein the inside surfaces of the outwardly extending arms of U-shaped guide rails 7 vertically guide the movement of lateral rollers 8 disposed on the belt.

The conveyor belt 14 is made up of a series of interconnected sections in the well-known manner and is suitably shaped with upwardly curved side portions for retaining material being conveyed within the belt. Along the under side of belt 14 a plurality of truck means spaced from one another are attached. The truck means includes a flat U-shaped member including a transverse base 12 having outwardly projecting lateral arms 9 connected thereto. As may be seen more clearly in FIGURE 4, arms 9 are provided with fork end portions 10 for receiving the corresponding shaft of the particular lateral roller 8 thereon. A nut 11 is used to secure the lateral shaft to the fork end 10 of arm 9. The arms 9 are suitably dimensioned with respect to guide rails 7 so that lateral rollers 8 will be properly guided along these guide rails so as to prevent vertical displacement of rollers 8, arms 9, and belt 14. In this connection, transverse base 12 is rigidly connected to belt 14 by means of bolts 13 so that a single unit is contemplated.

With respect to central roller 17, the same is mounted by means of shaft 16 in bore 15 of transverse base 12 by means of a nut 20. Shaft 16 may be adjusted in length by means of nut 20. It will be appreciated that roller 17 will form a part of the rigid unit including rollers 8 and the belt 14. Rollers 8 and central roller 17 are all disposed substantially in a common plane transverse to the path of movement of the belt so that displacement of the belt out of its normal path of movement will be prevented.

The belt 14 is suitably driven by means of a cable means, such as one including horizontal chain links 19, alternating with vertical chain links 30 (see FIGURE 3). Shaft 16 of central roller 17 is provided with a conical or outwardly diverging seat portion 18 for accommodating a corresponding horizontal link 19 thereat. In this connection it will be appreciated that the conical seat 18 on the bottom and the transverse base 12 on the top will rigidly maintain the chain link 19 in fixed position due to the tightening of nut 20 on shaft 16. Since shaft 16 substantially completely occupies the length and width of the inside opening of the particular horizontal link 19, said link will be prevented from lateral and longitudinal displacement in the same way as the same is prevented from displacement toward and away from the belt 14, due to the abutting portions of conical seat 18 and transverse base 12.

It will be appreciated that longitudinal chain link 19, central roller 17, shaft 16, transverse base 12, arms 9, and rollers 8 are all substantially in a common plane transverse to the path of movement of the belt 14. As a rigid unit, these parts will prevent displacement of the belt out of its normal path of movement and will be readily accommodated by the sprocket wheel on which the arrangement is mounted. For best results, rollers 8 and roller 17 are all provided with ball bearing mounting to minimize friction and afford easy operation.

Transversely disposed along the length of belt 14 intermediate the variously positioned truck means are the auxiliary transverse bases 21. As may be seen more clearly in FIGS. 5 and 6, these bases 21 carry the auxiliary chain seating means 22 which are provided with a longitudinal cross member 26, including a forward and a rearward projection as well as with a transverse cross member 25 including a pair of lateral projections. A top or peripheral projection 23 vertically extends above or beyond the longitudinal cross member 26 so that the auxiliary seating means takes the overall form of a double cross member. A chain link 19 is suitably received on the auxiliary seating means 22 such that the longitudinal cross member 26 substantially completely occupies the inside space of the link 19 and therefore prevents longitudinal and lateral displacements of the link. Moreover, the broad upper and lower surfaces of the link 19 are retained between the transverse cross member 25 and a sleeve 24 inserted through the top projection 23. In this manner the movement of the chain link 19 toward and away from the auxiliary transverse base 21 and in turn the belt is prevented.

Concerning FIGURE 2, a sprocket wheel 27 is shown having a plurality of detachable teeth 28 including conical end portions 31 inserted into corresponding recesses in sprocket wheel 27 and secured against release by means of pins 32. Teeth 28 are easily removed by first removing the pins 32. The top portions of the teeth 28 are provided with vertical slots for receiving the vertical links 30 longitudinally therealong as well as transverse end seats for receiving the end portions of horizontal links 19 in the well-known manner. Thus, the ends of horizontal links 19 bridge across the intervening spaces or recesses 29 between respective teeth 28 while these links 19 carry the central rollers 17 suitably disposed within the recesses 29. Alternating as desired with the central rollers 17, chain links 19 are provided with the auxiliary seating means 22 connected to the belt at their radially outward ends in the same manner as the truck means for central rollers 17 are connected to the belt.

FIGURE 3 shows schematically the alternating sequence of various long, horizontal chain links 19 carrying central rollers 17 and the auxiliary seating means 22 disposed within intermediate horizontal chain links 19. In the sequence shown, every fourth horizontal chain link 19 is provided with a central roller 17 while the three intermediate horizontal chain links 19 are provided with auxiliary seating means 22. A chain couple 33 of conventional design may be used for connecting the chain on the sprocket wheels.

In accordance with the construction of the invention, the auxiliary seating means prevent the longitudinal displacement of the belt with respect to the chain; in this manner only one central chain may be used for driving the belt in the well known manner wherein the belt will be suitably guided and maintained within its normal path of travel.

What is claimed is:

1. Conveyor belt arrangement comprising a conveyor belt, a plurality of spaced apart truck means connected to the conveyor belt therealong, said truck means each including a transverse base connected to said belt, a pair of spaced flanged members each outwardly extending from a corresponding end of said transverse member, coacting roller means mounted for rotation on each said truck means in a substantially common plane transverse to the plane of said belt, said roller means including a central roller mounted on said transverse base for rotation on a shaft perpendicular to the plane of the conveyor belt and a pair of lateral rollers each mounted on one of said flange members on a corresponding side of said central roller for rotation on an axis parallel to the plane of said belt and transverse to the path of movement of the belt, retaining guide means adjacent the path of the belt, said coacting roller means being operably guided along said guide means to prevent displacement of the truck means and in turn the belt out of the normal path of travel thereof, driving chain means, chain mounting means on the truck means substantially in said common plane for securing the chain means against displacement with respect to the truck means and a plurality of auxiliary seating means disposed along said conveyor belt between said truck means, each said auxiliary seating means being connected to said belt to prevent displacement of said auxiliary seating means with respect to said belt, said auxiliary seating means being adapted to receive thereon and secure against displacement with respect thereto a correspondingly situated chain link of the chain means used for moving the truck means and belt.

2. Arrangement according to claim 1 wherein said truck means is a U-shaped member, said central roller is mounted between the U-flanges of said member and said lateral rollers are each mounted via a shaft onto the corresponding end of one of said U-flanges, each said end having a fork seat for receiving said shaft.

3. Arrangement according to claim 1 wherein the shaft of said central roller is adjustable in length and provided with a curved seat diverging toward the central roller for receiving thereon a chain link of the chain means used for moving the truck means and belt, said shaft being adapted for substantially occupying the extent of the interior opening of said chain link to prevent longitudinal and lateral displacement of said chain link with respect to said shaft, and said curved seat on one broad surface of the chain link and the transverse base of said truck means on the other broad surface thereof together limiting the movement of said chain link toward and away from said transverse base upon adjustment of the length of said shaft.

4. Arrangement according to claim 1 wherein said auxiliary seating means includes a transverse auxiliary base connected to said belt, and a support shaft mounted on said auxiliary base perpendicularly to said belt, said support shaft having a forward and a rearward projection each extending longitudinally with respect to the path of travel of the belt for engaging and substantially occupying together with the adjacent portion of the support shaft the extent of the interior opening of the corresponding chain link to prevent longitudinal and lateral displacement of said chain link, said support shaft further having a pair of lateral projections each extending transversely with respect to the path of travel of the belt and parallel to the plane of the belt and securing means spaced from and parallel to said lateral projections and situated outwardly of said forward and rearward projections on said support shaft, said lateral projections and said securing means being together adapted to receive therebetween in abutting engagement the corresponding portions of said chain link and limit the displacement of said chain link in the axial direction of said support shaft.

5. Arrangement according to claim 1 wherein the retaining guide means adjacent the path of travel of said belt include a separate retaining track positioned for guiding engagement with each of said rollers.

6. Arrangement according to claim 5 wherein said retaining guide means includes a U-shaped central track positioned for engagement with said central roller along the inside lateral edges thereof, and a pair of lateral U-shaped tracks each positioned for engagement with a corresponding lateral roller along the inside lateral edges thereof.

7. Arrangement according to claim 6 wherein the intermediate portion of each of the said lateral U-shaped tracks is positioned on a corresponding outside lateral edge of the U-shaped central track.

8. Arrangement according to claim 5 wherein said retaining guide means are positioned adjacent the forward and return paths of travel of said belt.

9. In a conveyor belt arrangement including two spaced sprocket means, endless chain means including alternating vertical and horizontal chain links mounted for movement on said sprocket means and a conveyor belt mounted for movement on said chain means along a path of travel both in a forward course and a return course around said sprocket means, the improvement which comprises a plurality of spaced apart truck means connected to the conveyor belt therealong, said truck means each including a transverse base connected to said belt, a pair of spaced flange members outwardly extending from a corresponding end of said transverse member, coacting roller means mounted for rotation on each said truck means in a substantially common plane transverse to the plane of said belt, said roller means including a central roller mounted on said transverse base for rotation on a shaft perpendicular to the plane of the conveyor belt and a pair of lateral rollers each mounted on one of said flange members on a corresponding side of said central roller for rotation on an axis parallel to the plane of said belt and transverse to the path of movement of the belt, the shaft of said central roller being adjustable, retaining guide means adjacent the path of the belt, said coacting roller means being operably guided along said guide means to prevent displacement of the truck means and in turn the belt out of the normal path of travel thereof, chain mounting means on the truck means substantially in said common plane for securing the chain means against displacement with respect to the truck means, said chain mounting means including said adjustable shaft, said shaft being provided with a curved seat diverging toward the central roller, a correspondingly positioned chain link of the chain means being disposed along said shaft, said shaft substantially occupying the extent of the interior opening of said chain link to prevent longitudinal and lateral displacement of said chain link with respect to said shaft, said curved seat on one broad surface of the chain link and the transverse base of the truck means on the other broad surface thereof, together limiting the movement of said chain link toward and away from said transverse base and in turn said belt upon adjustment of the length of the shaft, and a plurality of auxiliary seating means being disposed along the conveyor belt between said truck means, each said auxiliary seating means including a transverse auxiliary base connected to said belt to prevent displacement of said auxiliary seating means with respect to said belt, and a support shaft mounted on said auxiliary base perpendicularly to said belt, said support having a forward and a rearward projection each extending longitudinally with respect to the path of travel of the belt and engaging and substantially occupying together with the adjacent portion of the support shaft the extent of the interior opening of a correspondingly positioned chain link to prevent longitudinal and lateral displacement of said chain link, said support shaft further having a pair of lateral projections each extending transversely of the belt and parallel to the plane of the belt, and securing means spaced from and parallel to said lateral projections and situated outwardly of said forward and rearward projections on said support shaft, said lateral projections and said securing means together receiving therebetween in abutting engagement the corresponding portions of said chain link and limiting the displacement of said chain link in the axial direction of said support shaft.

10. Improvement according to claim 9 wherein said retaining guide means includes a separate retaining track positioned for guiding engagement with each of said rollers in said forward course and said return course of said belt, said guide means including a U-shaped central track positioned for engagement with said central roller along the inside lateral edges thereof, and a pair of lateral U-shaped tracks each positioned for engagement with a corresponding lateral roller along the inside lateral edges thereof.

11. Improvement according to claim 10 wherein said sprocket means each includes a plurality of radially spaced replaceable teeth, said teeth having longitudinal slots for receiving the vertical links of said chain and transverse end seats for receiving the corresponding ends of the horizontal links of said chain interconnected with said vertical links, the space between adjacent teeth being larger than the diameter of the central rollers for receiving therewithin the corresponding central rollers connected with the trunk means accompanying certain of said horizontal chain links and the corresponding auxiliary seating means accompanying at least a portion of the remaining horizontal chain links.

References Cited in the file of this patent

UNITED STATES PATENTS

| 2,757,786 | Grebe | Aug. 7, 1956 |
| 2,808,146 | Leach | Oct. 1, 1957 |

FOREIGN PATENTS

| 957,374 | Germany | Jan. 31, 1957 |

UNITED STATES PATENT OFFICE
CERTIFICATE OF CORRECTION

Patent No. 3,107,778                      October 22, 1963

Friedrich Jordan

It is hereby certified that error appears in the above numbered patent requiring correction and that the said Letters Patent should read as corrected below.

Column 3, line 5, for "struck" read -- truck --; column 8, lines 20 and 21, after "support" insert -- shaft --.

Signed and sealed this 21st day of April 1964.

(SEAL)
Attest:
ERNEST W. SWIDER

Attesting Officer

EDWARD J. BRENNER

Commissioner of Patents